(12) United States Patent
Tsiava

(10) Patent No.: US 8,578,738 B2
(45) Date of Patent: *Nov. 12, 2013

(54) METHOD FOR MELTING A BATCH OF RAW MATERIALS BY A CROWN BURNER

(75) Inventor: Remi Pierre Tsiava, Saint Germain-les_Corbeil (FR)

(73) Assignee: L'Air Liquide, Societe Anonyme pour l'Etude et l'Exploitation des Procedes Georges Claude, Paris (FR)

( * ) Notice: Subject to any disclaimer, the term of this patent is extended or adjusted under 35 U.S.C. 154(b) by 0 days.

This patent is subject to a terminal disclaimer.

(21) Appl. No.: 13/602,852

(22) Filed: Sep. 4, 2012

(65) Prior Publication Data
US 2012/0324951 A1    Dec. 27, 2012

Related U.S. Application Data

(63) Continuation of application No. 11/721,191, filed as application No. PCT/FR2005/050970 on Nov. 25, 2005, now Pat. No. 8,256,245.

(30) Foreign Application Priority Data

Dec. 9, 2004    (FR) ...................................... 04 52913

(51) Int. Cl.
*C03B 3/00*    (2006.01)
*C03B 5/235*   (2006.01)
*C03B 5/24*    (2006.01)

(52) U.S. Cl.
USPC .......................... 65/136.3; 65/136.2; 65/135.9

(58) Field of Classification Search
USPC ................................... 65/135.9, 136.2, 136.3
See application file for complete search history.

(56) References Cited

U.S. PATENT DOCUMENTS 3,592,622 A  *  7/1971  Shepherd .................... 65/136.3
3,592,623 A  *  7/1971  Shepherd .................... 65/134.4

(Continued)

FOREIGN PATENT DOCUMENTS

EP    0546238    6/1993
EP    0710798    5/1996

(Continued)

OTHER PUBLICATIONS

International Search Report and Written Opinion for PCT/FR2005/050970, mailed Jun. 20, 2006.

(Continued)

*Primary Examiner* — Jason L. Lazorcik
(74) *Attorney, Agent, or Firm* — Christopher J. Cronin

(57) ABSTRACT

The invention concerns a method for melting a composition of raw materials including introducing the composition in an oven to form a layer (2) at the surface of the molten pool (4). An oxycombustion burner (10) is arranged above the pool and directed towards the composition layer (2) to produce a melting front (3). Parameters of the burner are adjusted to produce a large covering flame (12) causing an essentially radiation-based thermal transfer. Additionally, a plane containing a longitudinal section of the flame (Z-Z) and a horizontal direction perpendicular to the axis of the oven (X-X) intersects the melting front (3) at a height (h) included ranging between one third and half of the thickness of the composition (e). Such a method provides for a stable operation of the oven and is particularly adapted to a large-capacity oven.

11 Claims, 2 Drawing Sheets

(56) References Cited

U.S. PATENT DOCUMENTS

| | | | | |
|---|---|---|---|---|
| 4,473,388 | A * | 9/1984 | Lauwers | 65/134.4 |
| 4,816,056 | A * | 3/1989 | Tsai et al. | 65/134.4 |
| 5,116,399 | A * | 5/1992 | Lauwers | 65/135.1 |
| 5,139,558 | A * | 8/1992 | Lauwers | 65/134.4 |
| 5,575,637 | A * | 11/1996 | Slavejkov et al. | 431/8 |
| 5,611,682 | A * | 3/1997 | Slavejkov et al. | 431/8 |
| 6,079,229 | A * | 6/2000 | Legiret et al. | 65/135.9 |
| 6,109,062 | A * | 8/2000 | Richards | 65/134.4 |
| 6,154,481 | A * | 11/2000 | Sorg et al. | 373/30 |
| 6,203,314 | B1 * | 3/2001 | Philippe et al. | 432/19 |
| 6,237,369 | B1 * | 5/2001 | LeBlanc et al. | 65/134.1 |
| 6,357,264 | B1 * | 3/2002 | Richards | 65/135.2 |
| 6,422,041 | B1 * | 7/2002 | Simpson et al. | 65/134.4 |
| 6,519,973 | B1 * | 2/2003 | Hoke et al. | 65/134.4 |
| 6,705,117 | B2 * | 3/2004 | Simpson et al. | 65/134.4 |
| 6,705,118 | B2 * | 3/2004 | Simpson et al. | 65/134.4 |
| 6,722,161 | B2 * | 4/2004 | LeBlanc | 65/134.4 |
| 7,392,668 | B2 * | 7/2008 | Adams et al. | 65/346 |
| 7,475,569 | B2 * | 1/2009 | Baker et al. | 65/335 |
| 8,256,245 | B2 * | 9/2012 | Tsiava | 65/136.3 |
| 2001/0039813 | A1 * | 11/2001 | Simpson et al. | 65/134.4 |
| 2009/0293546 | A1 * | 12/2009 | Tsiava | 65/66 |
| 2012/0324951 | A1 * | 12/2012 | Tsiava | 65/29.12 |

FOREIGN PATENT DOCUMENTS

| | | |
|---|---|---|
| EP | 0748981 | 6/1996 |
| EP | 1319150 | 3/2002 |
| WO | 0225169 | 3/2002 |

OTHER PUBLICATIONS

U.S. Appl. No. 11/721,191 form PTO-892 from Office Action dated Dec. 22, 2011.

* cited by examiner

METHOD FOR MELTING A BATCH OF RAW MATERIALS BY A CROWN BURNER

CROSS-REFERENCE TO RELATED APPLICATIONS

This application is a Continuation of prior application Ser. No. 11/721,191, filed Aug. 12, 2009, which is a 371 of International PCT Application PCT/FR2005/050970, filed Nov. 21, 2005.

BACKGROUND

The present invention relates to a method of melting a batch of raw materials using a burner placed in the crown of a furnace.

Many industrial processes include a step of melting raw materials, especially for producing materials that do not exist in the natural state, or that exist in the natural state in insufficient quantities or with a low level of purity. Metals and alloys are thus smelted in metallurgy. Likewise, glasses, frits and enamels are produced on an industrial scale by melting vitrifiable batches. In particular, industrial plants for manufacturing flat glass, especially of the soda-lime type, comprise melting furnaces of very large capacity and dimensions.

In the melting field, a mixture of raw materials, the proportions of which are determined according to the material that it is desired to obtain, is called a "batch". The batch is generally in the form of a substantially homogeneous powder, which is relatively dry and well separated.

To obtain a high output of molten material, a large-capacity furnace running continuously is used. The batch is continuously introduced into the furnace tank on a first side of the furnace and the molten material is discharged, also continuously, on a second side of the furnace, generally opposite the first side. One of the major challenges in installations of this type is to maintain continuity and stability of the melting conditions, from which, particularly, homogeneity of the molten material obtained results.

A charger is used to pour the batch into the tank on top of the fill level of the tank, in the form of a curtain of specified width. The flow of batch thus charged is approximately constant and uniformly distributed over the entire charging width. Given that the charged batch is less dense than the molten material, the batch, which is still pulverulent, stagnates on the surface of the melt. A batch layer that floats on the melt is thus formed. This layer is pushed slowly toward the downstream end of the furnace by the permanent flow of batch that continues to be poured in.

When the batch layer reaches a point in the tank where the temperature is high enough, the batch contained in the layer melts along a well-defined front. This melting front, usually called the "slope", is the boundary of the batch layer. In general, the shape and orientation of the melting front result from complex mechanisms that are poorly controlled. Convection of the molten liquid within the melt and the gas streams above the melt form part of these mechanisms.

Combustion heating is often used for such furnaces. To do this, one or more burners are placed above the furnace tank. The stability of the melting conditions then depends critically on many parameters, such as the arrangement of the burners, their number, the proportion of fuel to oxidizer used, the distance between the flame(s) of the burner(s), the fill level of the tank, etc.

When a burner of a type described in either of European Patent Applications 1 319 150 and 0 748 981 is used, a narrow flame is obtained. When this is directed toward the batch layer, a melting front is obtained in a limited flame-impact region. When the furnace is operating in a steady state, the melting front of the batch layer then has the shape of a V open toward the downstream end of the furnace. Different batch portions are therefore melted at locations in the furnace that correspond to different levels of advance along the charging direction. This causes deviations in the batch melting conditions. Furthermore, clumps of batch collapse randomly along the batch front, suddenly dropping into the melt. The slope is therefore eroded irregularly, causing uncontrolled movements of the melting front. The operation of the furnace is therefore unstable.

It is possible to place, perpendicular to the charging direction, several burners identical to the previous one in order to push the entire melting front into an upstream part of the furnace. The number of burners used makes such a solution expensive and difficult to implement, especially because of the frequency of the maintenance work on the burners that is therefore necessary.

SUMMARY OF INVENTION

One object of the present invention therefore consists in proposing a melting method that does not have the abovementioned drawbacks, or for which these drawbacks are reduced.

To do this, the invention proposes a method of melting a batch of raw materials, comprising the following steps:

the batch is introduced into a furnace in a charging direction parallel to a longitudinal central axis of the furnace, distributing the batch substantially continuously and uniformly over a defined charging width, so as to form a layer of the batch on the surface of the melt; and an oxyfuel burner is placed above the melt, the burner being directed toward the batch layer so as to create a melting front of the batch present in the layer.

The method furthermore includes a step of adjusting the parameters of the burner, carried out so that:

the burner produces a flat flame having a horizontally elongate cross section;

the plane containing a longitudinal section of the flame and a horizontal direction perpendicular to the axis of the furnace intersects the batch melting front at a height between one third and one half of the thickness of the batch layer measured from the surface of the melt, and intersects the surface of the melt along a line perpendicular to the axis of the furnace; and the flame transfers heat to the batch melting front essentially radiatively.

Thus, in a method according to the invention the parameters of the burner are adjusted so as to obtain a broad covering flame directed toward the melting front. Furthermore, given that the heat transfer from the flame to the batch melting front is essentially radiative, this transfer takes place over a substantial part of the width of the furnace at the melting front. The melting front therefore has a long straight portion oriented perpendicular to the longitudinal axis of the furnace.

A main part of the batch is thus melted at the same level of advance in the furnace, along the longitudinal axis of the latter. In addition, the melting conditions are substantially identical for batch portions located at different points on the straight part of the melting front. The batch is therefore melted in a continuous and uniform manner, under particularly stable conditions. In particular, sudden collapse of batch clumps no longer occurs in the straight part of the melting front.

This stability also results from the fact that the shape and orientation of the melting front are fixed by the nature of the flame generated by the burner. The configuration of the melting front now depends only slightly on uncontrolled effects, such as the convection of liquid material contained in the furnace tank, or such as the gas streams caused by the flame just above the batch layer. The batch melting conditions are therefore well controlled.

One advantage of a method according to the invention lies in the fact that the parameters of a single burner define the nature of the flame and thus the configuration of the melting front over a substantial distance perpendicular to the longitudinal axis of the furnace. A single burner is sufficient to fix the configuration of a large portion of the melting front, thereby making the method easy to implement. Furthermore, the reduced number of burners needed to heat the entire furnace makes the method particularly economical, both as regards the initial investment and as regards the maintenance work during operation of the furnace.

Preferably, the parameters of the burner are adjusted so that a longitudinal end of the flame does not touch the melting front of the batch. The flame is therefore short and the ratio of heat transfer that takes place radiatively to the total heat transfer from the flame is further increased. Thus, the straight portion of the melting front is even greater.

The inventors have observed that, when the burner parameters are adjusted according to the invention, the burner produces a particularly low-momentum flame. The expression "low-momentum flame" is understood to mean a flame which is sustained by injecting fluids, among which are the fuel and an oxygen-containing gas, which transmits a limited total momentum to said fluids. This momentum depends in particular on the geometrical and operational parameters of the burner.

BRIEF DESCRIPTION OF THE DRAWINGS

Other features and advantages of the present invention will become apparent in the following description of a nonlimiting example of its implementation, with reference to the appended drawings in which.

For the sake of clarity, the dimensions of the devices shown in the figures are not in proportion with actual dimensions. In particular, measured dimensions in these figures that are associated with different actual directions are not transposed on the same scale. Furthermore, identical references used in the two figures denote identical elements.

DETAILED DESCRIPTION OF THE INVENTION

Figure 1:
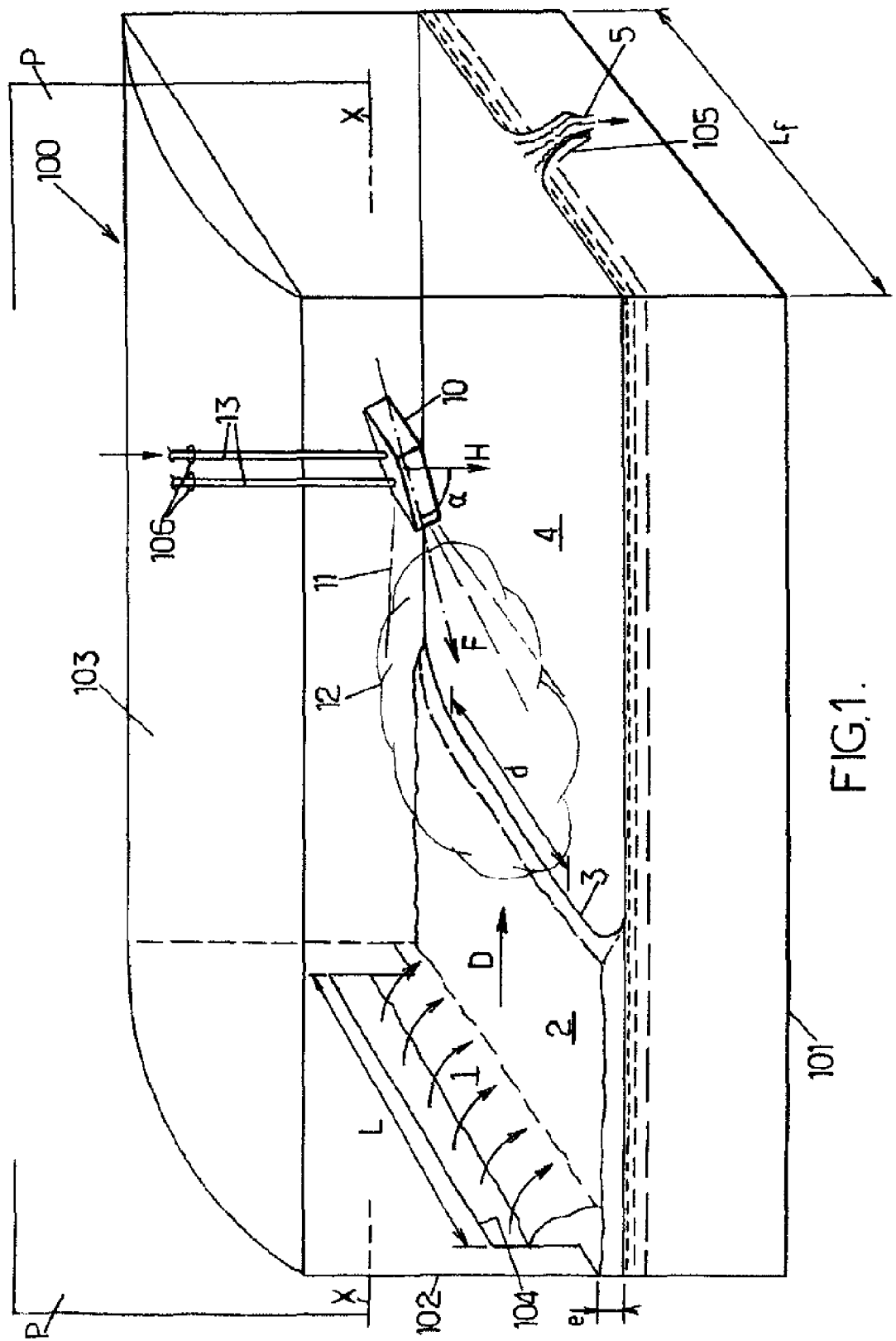
FIG. 1 illustrates a furnace in which a melting method according to the invention is implemented.

As shown in FIG. 1, a furnace 100 comprises a tank 101, sidewalls 102 and a cover structure 103 called the crown. As an example, this furnace may be a glass production furnace.

The batch of raw materials is charged via a horizontal opening 104 made in one of the walls 102, over a length L. The batch is poured into the furnace in the form of a substantially continuous curtain 1 extending over the length L, which is called the charging width.

The molten batch forms a melt 4 contained in the tank 101. A spout 105 is provided in the wall of the furnace on the opposite side from the opening 104, via which spout the molten material flows out in the form of a continuous output stream 5.

The material contained in the furnace 100 moves overall from the charging opening 104 toward the spout 105 along the direction D, called the charging direction. The surface of the melt 4 is exposed in a downstream part of the furnace 100 and is covered in an upstream part of the furnace 100 by a still-solid batch layer 2, which floats on top of the melt. Between these two parts, the layer 2 has a sharp boundary 3 at which the batch contained in the layer 2 melts and is converted into liquid, which enters the melt 4. The boundary 3 of the layer 2 is the melting front of the batch.

In FIG. 1, X-X denotes the central longitudinal axis of the furnace 100. This axis is horizontal. The tank 101 has a rectangular base and the X-X axis intersects the width $L_f$ of the furnace 100 at a point halfway along its width. P denotes the vertical plane that includes the X-X axis.

A method according to the invention uses an oxyfuel burner 10. As is known, such a burner produces a flame from an injection of a liquid or gaseous fuel and an injection of oxidizer consisting of a gas containing at least 60% oxygen by volume. Preferably, the oxygen-containing gas comprises at least 90% oxygen by volume. Such an oxyfuel burner is relatively compact and lightweight compared with an air-fuel burner. This makes it particularly easy to install it in a furnace. In particular, the burner 10 may be positioned through the holes 106 pierced in the crown 103 above the melt. Ducts 13 pass through the holes 106 in order to feed the burner 10 with oxygen-containing gas and with fuel. Thanks to the small dimensions and low weight of the burner 10, it is unnecessary to provide a quad in the crown 103 for passage of the ducts 13. The design and construction of the crown 103 are thereby facilitated.

The burner 10 lies in the plane P. It is directed toward the batch layer 2 so as to produce one or more jets 11 of fuel and oxygen-containing gas that are distributed on each side of the plane P. To do this, the burner 10 may be inclined to the vertical direction, denoted by H in FIG. 1, and oriented downward. The angle between the mean exit direction F of the jets produced by the burner 10 and the direction H is denoted by α. The angle α is preferably between 30° and 75° and more particularly between 45° and 65°. In FIG. 1, the reference 12 denotes the flame produced by the burner 10.

The burner 10 may be of a model as described in U.S. Pat. No. 6,068,468. Such a burner possesses several fuel outlets and several oxygen-containing gas outlets. It is particularly suitable for obtaining a broad covering flame.

By suitably adjusting the burner 10, a principal mode of transferring the thermal energy produced by the flame 12 is adopted, this transfer taking place radiatively. Preferably at least 60% of the transfer of heat generated by the flame 12 takes place radiatively. A particularly large part of the melt therefore receives the heat produced by the flame 12. When the burner 10 thus regulated is directed toward the batch layer 2, the melting front 3 is located in the region of thermal impact by the flame 12. Given that this impact region is wide, the melting front 3 has a large straight portion perpendicular to the X-X axis in a part of the furnace facing the burner 10. In FIG. 1, d is the length of this straight portion of the front 3.

Since the burner 10 is centered with respect to the width of the furnace 100, the melting front 3 is symmetrical with respect to the plane P. In this way, the batch layer 2 is melted in the same way on both sides of the furnace 100 with respect to the plane P.

To further promote a radiative heating mode rather than a convective one, the burner 10 may furthermore be adjusted so as to generate a flame 12 that is short and luminous. To do this, the flame 12 is a low-momentum flame and has a fuel-rich zone. The use of an oxygen-fuel burner 10, instead of an air-fuel burner, is particularly appropriate for obtaining such combustion conditions. The temperature is then particularly high in the fuel-rich zone and the heat transfer to the furnace charge essentially takes place radiatively. The heat transfer from the flame to the batch layer therefore takes place with the flame a certain distance away from the batch layer, thereby making it easier to obtain a melting front having a large straight portion.

Certain parameters of the burner 10, which are adjusted so as to implement a melting method according to the invention, may be chosen from the following: the number, dimensions, positions and inclinations of the orifices for injecting fluids into the furnace 100, said fluids including a fuel and an oxygen-containing gas. Thus, the oxyfuel burner described in the publication EP-A1-0 754 912 is particularly suitable for implementing the method according to the invention.

To obtain a low-momentum flame 12, certain parameters of the burner 10 are adjusted so that the fluids injected into the furnace 100 by the burner have a total momentum of between 0.58 N and 5 N. Preferably, the total momentum of these fluids is between 1.2 N and 2.5 N.

Figure 2:
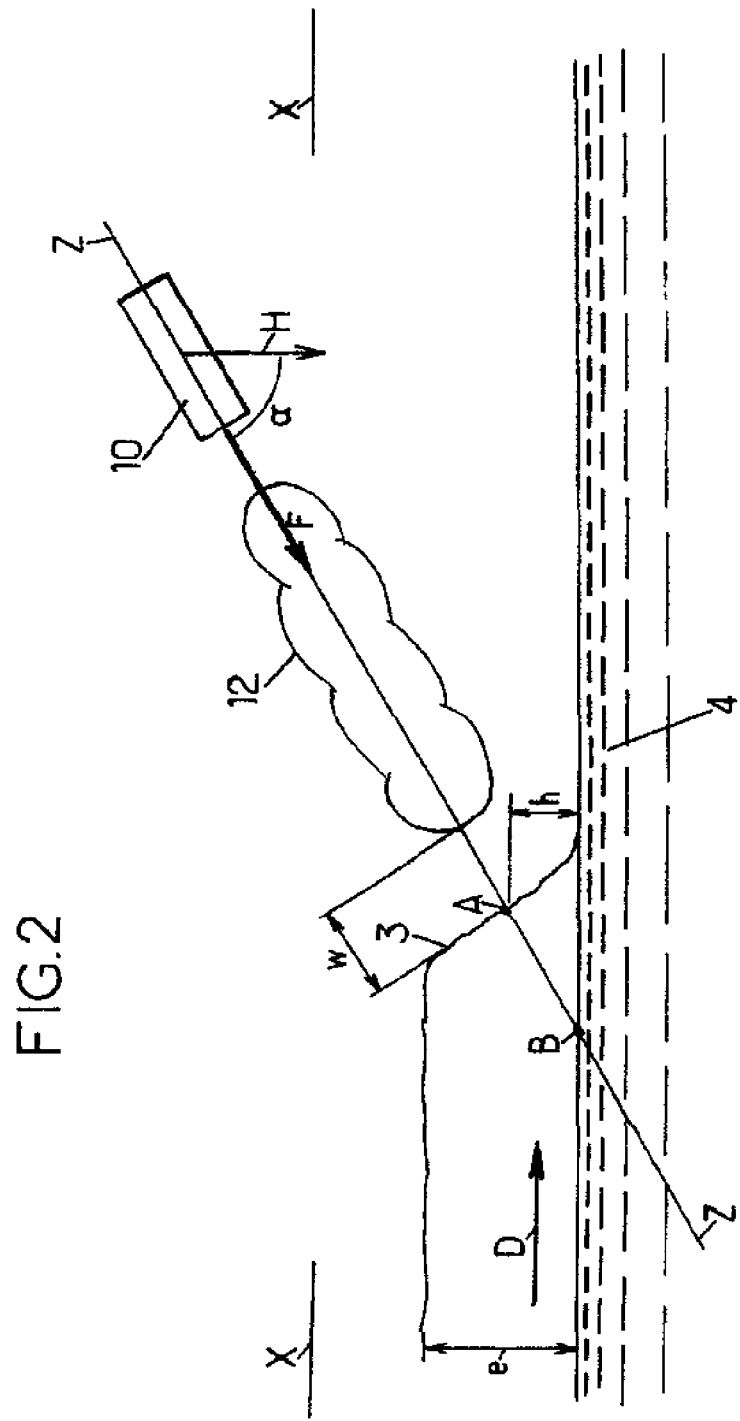
FIG. 2 shows a cross section of the furnace of FIG. 1.

FIG. 2 is a section through the furnace 100 in the plane P showing more precisely the geometric parameters of both the burner 10 and the flame 12. The flame 12 has a flattened shape, distributed symmetrically on either side of the plane P. F corresponds to the direction of the flame 12 in the plane P. The Z-Z axis, passing through the burner 10 and parallel to the direction F, intersects the melting front 3 at the point denoted A in the plane P. A is located at a height, measured from the surface of the melt 4, that lies between one third and one half of the thickness e of the batch layer 2. The distance between the end of the flame 12 and the melting front 3 is w. Since w is non-zero, the flame 12 does not touch the batch layer 2.

The inclined plane containing the Z-Z axis and a horizontal direction perpendicular to the plane P contains a longitudinal section of the flame 12. It intersects the surface of the melt 4 along a line perpendicular to the X-X axis passing through the point B.

When steady-state melting is established, the following equation relates the heating power P delivered by the flame 12 to the characteristics of the layer 2:

$$P = \Delta H \rho^2 V,$$

where $\Delta H$ denotes the average enthalpy of melting of the batch, $\rho$ denotes the density of the batch in the layer 2 and V is the feed rate. It is therefore possible to adjust the power P of the burner 10 according to the desired output in the spout 105. The consumption of oxygen and fuel may thus be reduced to values just sufficient to melt the quantity of batch corresponding to the output. To give an example, it is possible to inject 10 $Sm^3/h$ of natural gas for 20 $Sm^3/h$ of oxygen via the burner 10, for a batch feed rate of 12 kg/h in the manufacture of glass.

According to an improvement of a method according to the invention, the position of advance of the melting front 3 on the surface of the melt 4, along the X-X axis, may also be used as a criterion for adjusting certain parameters of the burner 10. In particular, the fuel flow rate, the oxygen-containing gas flow rate, the fuel injection pressure, the oxygen-containing gas injection pressure and the angle $\alpha$ may be adjusted in this way.

Optionally, the method may furthermore include installing a system for detecting the position of advance of the melting front 3 along the X-X axis. Certain parameters of the burner may then be slaved to the position of advance of the melting front that is detected.

To give an example, the system for detecting the position of advance of the melting front 3 may comprise a laser (not shown). As soon as the laser beam is intersected or altered by movement of the melting front 3, a feedback signal is sent to an automatic control unit for controlling the parameters of the burner 10, so as to correct certain parameters in order to compensate for the movement of the front 3.

It has been shown that a melting method according to the invention has many advantages, among which the following may be recalled or mentioned:
- the method provides particularly stable melting conditions;
- it may be implemented in large-capacity furnaces;
- the burner is simple to mount and requires only few fitments in the crown of the furnace;
- the furnace equipment and maintenance costs are reduced;
- the consumption of fuel and oxygen is reduced;
- the molten material extracted from the furnace is very homogeneous;
- the flame directed against the melting front constitutes a screen that prevents batch dust coming from the layer to propagate toward the downstream end of the furnace, to the outside of the furnace and through the flue;
- the method is flexible and can be simply adapted when different batches are melted in succession in the same furnace. The burner parameters are only adjusted for each batch, so as to restore a straight shape of the melting front. Optionally, they may also be adjusted so as to displace the melting front along the charging direction to a suitable position for each batch; and
- the method can be easily automated.

I claim:

1. A method of melting a batch of raw vitrifiable materials, comprising the following steps:
   a batch of raw vitrifiable materials is introduced into a furnace in a charging direction (D) parallel to a longitudinal central axis (X-X) of the furnace, distributing the batch substantially continuously and uniformly over a defined charging width (L), so as to form a layer of the batch on the surface of the melt; and
   an oxyfuel burner is placed above the melt in a vertical plane (P) including the axis (X-X) of the furnace, the burner being directed toward the batch layer so as to create a melting front of the batch present in the layer, the melting front being symmetrical with respect to the plane P,
   adjusting the parameters of the burner, carried out so that:
      the burner produces a flat flame having a horizontally elongate cross section;
      a plane containing a longitudinal section of the flame and a horizontal direction perpendicular to the axis (X-X) of the furnace intersects the batch melting front at a height (h) between one third and one half of the thickness (e) of the batch layer measured from the surface of the melt, and intersects the surface of the melt along a line perpendicular to the axis (X-X) of the furnace; and
      the flame produces a transfer of heat to the melting front of the batch essentially radiatively.

2. The method of claim 1, in which the parameters of the burner are adjusted so that a longitudinal end of the flame does not touch the melting front of the batch.

3. The method of claim 1, in which the burner resides in a vertical plane that includes the longitudinal central axis (X-X) of the furnace.

4. The method of claim 1, in which the burner is inclined to a vertical direction.

5. The method of claim 4, in which the burner is downwardly inclined at an angle ($\alpha$) between 45° and 65° to the vertical direction.

6. The method of claim 1, in which the burner is positioned through holes drilled in a crown structure above the melt.

7. The method of claim 1, in which certain parameters of the burner are adjusted so that the fluids injected into the furnace by the burner have a total momentum of between 0.58 N and 5 N.

8. The method of claim 1, in which certain parameters of the burner are adjusted according to the position of advance of the melting front along the axis (X-X) of the furnace.

9. The method of claim 8, in which the parameters of the burner adjusted according to the position of advance of the melting front are chosen from the fuel flow rate, the oxygen-containing gas flow rate, the fuel injection pressure, the oxygen-containing gas injection pressure and the angle ($\alpha$) of inclination of the burner to the vertical direction.

10. A method of melting a batch of raw vitrifiable materials, comprising the following steps:
   the batch of raw vitrifiable materials is introduced into a furnace in a charging direction (D) parallel to a longitudinal central axis (X-X) of the furnace, distributing the batch substantially continuously and uniformly over a defined charging width (L), so as to form a layer of the batch on the surface of the melt;
   an oxyfuel burner is placed above the melt, the burner being directed toward the batch layer so as to create a melting front of the batch present in the layer;
   installing a system for detecting the position of advance of the melting front along the axis (X-X) of the furnace, and in which certain parameters of the burner are slaved to the detected position of advance of the melting front so that:
      the burner produces a flat flame having a horizontally elongate cross section;
      the plane containing a longitudinal section of the flame and a horizontal direction perpendicular to the axis (X-X) of the furnace intersects the batch melting front at a height (h) between one third and one half of the thickness (e) of the batch layer measured from the surface of the melt, and intersects the surface of the melt along a line perpendicular to the axis (X-X) of the furnace; and
      the flame produces a transfer of heat to the melting front of the batch essentially radiatively.

11. The method of claim 10, in which the system for detecting the position of advance of the melting front comprises a laser.

* * * * *